United States Patent Office 2,767,016
Patented Oct. 16, 1956

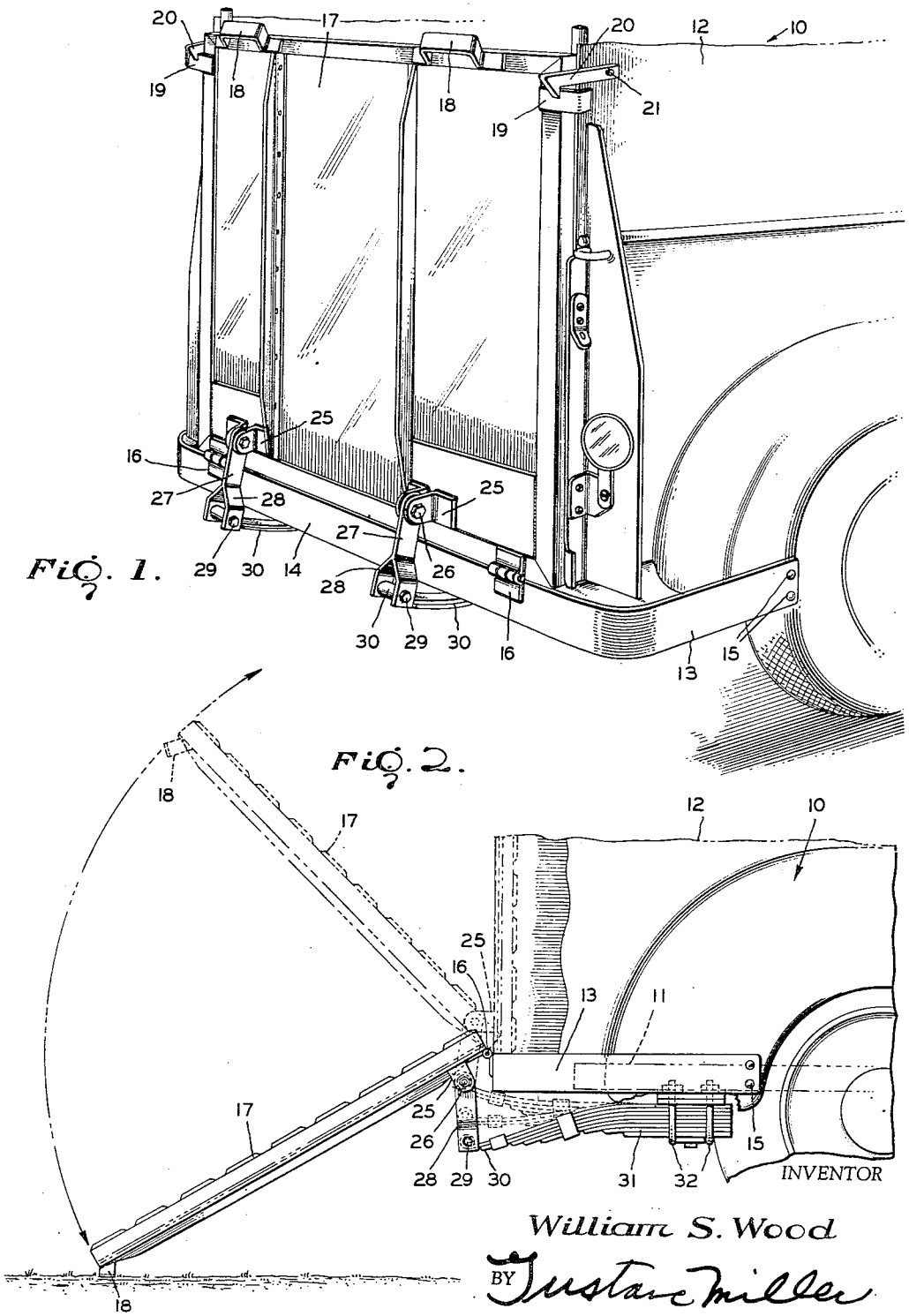

2,767,016

TAIL GATE LIFT

William S. Wood, Springville, Calif.

Application September 27, 1954, Serial No. 458,465

1 Claim. (Cl. 296—57)

This invention relates to a tail gate lift and has primary applicability to the tail gate of trucks or similar vehicles.

A primary object of the invention is the provision of spring means normally biasing the tail gate of a vehicle towards closed position to facilitate raising of the same with a minimum of effort and difficulty.

A further object of the invention is the provision of such a spring structure positioned beneath the vehicle body in a position in which it cannot become entangled with any animal which may jump over the side of the vehicle.

A still further object of the invention is the provision of leaf spring means exerting a maximum lifting force on the gate by direct upward pressure.

Still another object of the invention is the provision of spring means in conjunction with a tail gate, having a predetermined spring pressure in accordance with the weight of the gate whereby the gate may be maintained in any selected position of adjustment by spring pressure alone.

Other objects reside in the combinations of elements, arrangements of parts and features of construction, all as will be more fully pointed out hereinafter and shown in the accompanying drawings, wherein is shown a preferred embodiment of this inventive concept.

In the drawings:

Fig. 1 is a perspective view of the rear end of a vehicle having a tail gate disclosing the lift means of the instant invention applied thereto.

Fig. 2 is a side elevational view of the rear end of a vehicle, partially broken away, disclosing the tail gate in fully opened position, and, in dotted lines, in partially opened position.

Similar reference characters refer to similar parts throughout the several views of the drawing.

Having reference now to the drawings in detail, there is generally indicated at 10 a vehicle body such as an open bodied truck including a frame or chassis 11 upon which the body 12 is mounted. Fixedly secured to the side pieces of frame 11 as by bolts 15 on the ends 13 of a U-shaped bar 14 which extends across the rear end and below the body 12.

Hinges 16 pivotally carry a tail gate 17 on the bight of bar 14. Tail gate 17 may be of any desired conventional construction and may include handles 18 and latch members 19, the latter being adapted to be engaged by keepers 20 pivotally carried as by pivots 21 on body 12.

Adjacent the lower edge of gate 12 but above hinges 16 are two pairs of spaced apart brackets 25 between each pair of which is pivoted, as by a pivot 26 one end of a link 27. The other end of each link 27 is bifurcated as at 28 and the bifurcations are apertured for the reception of a transversely extending pin 29 which extends through a suitable loop 30 in the longest arm of a laminated leaf spring 31. Each spring 31 is secured to the underside of frame 11 in any desired manner or by shackle bolts 32.

From the foregoing the operation of the device should now be obvious. The gate 12 is lowered by manual pressure to the position shown in Fig. 2 to permit the egress of livestock from the vehicle body. When it is desired to re-elevate the gate, the bias of leaf spring 31 is of sufficient strength to reduce the effective weight of the gate to a proportion whereby the same may be readily lifted with a pressure of 10 to 15 lbs. in contrast to the normal 100 to 150 lbs. weight of the gate.

From the foregoing it will now be seen that there is herein provided an improved tail gate which, according to the strength of springs 30 relative to the weight of gate 17, will hold the gate in any desired position of adjustment, and which accomplishes all of the objects of this invention and others, including many advantages of great practical utility and commercial importance.

As many embodiments may be made of the inventive concept, and as many modifications may be made in the embodiment hereinbefore shown and described, it is to be understood that all matter hereinbefore shown and described is to be interpreted merely as illustrative, and not in a limiting sense.

Having thus set forth and disclosed the nature of this invention, what is claimed is:

In a device of the character described, a vehicle having a frame and a body, a tail gate closing said body, and hingedly attached thereto, a leaf spring positioned beneath said frame and having one end extending beyond the end of said frame, a lug on the lower part of said tail gate, a link connecting said lug and the extending end of said spring, said link comprising a bifurcated member having its bifurcations connected on opposite sides of said leaf spring and being pivotally connected at its opposite end to said lug, said leaf spring thereby serving normally to bias said tail gate towards closed position.

References Cited in the file of this patent

UNITED STATES PATENTS

| 2,057,555 | Clark | Oct. 13, 1936 |
| 2,584,366 | Perry | Feb. 5, 1952 |
| 2,649,308 | Bice | Aug. 18, 1953 |
| 2,689,764 | Park | Sept. 21, 1954 |

FOREIGN PATENTS

| 329,521 | Great Britain | May 22, 1930 |
| 638,263 | Great Britain | Apr. 25, 1949 |